United States Patent [19]

Toide et al.

[11] Patent Number: 5,572,364
[45] Date of Patent: Nov. 5, 1996

[54] PROJECTION LENS SYSTEM

[75] Inventors: Eiichi Toide; Toshihide Kaneko, both of Nagaokakyo, Japan

[73] Assignee: Mitsubishi Denki Kabushiki Kaisha, Tokyo, Japan

[21] Appl. No.: 263,492

[22] Filed: Jun. 21, 1994

Related U.S. Application Data

[63] Continuation of Ser. No. 941,380, Sep. 4, 1992, abandoned.

[30]    Foreign Application Priority Data

Sep. 13, 1991 [JP] Japan ................................ 3-234743
Sep. 13, 1991 [JP] Japan ................................ 3-234744

[51] Int. Cl.$^6$ ............................................. G02B 3/00
[52] U.S. Cl. ...................... 359/649; 359/708; 359/713; 359/754; 359/755; 359/761
[58] Field of Search ........................... 359/649, 708, 359/713, 761, 754, 755

[56]            References Cited

U.S. PATENT DOCUMENTS 4,300,817  11/1981  Betensky .
4,776,681  10/1988  Moskovich .
4,801,196   1/1989  Betensky ................................ 359/649
4,989,961   2/1991  Yoshioka ............................... 359/649
5,130,850   7/1992  Toide ..................................... 359/649
5,148,320   9/1992  Toide ..................................... 359/649
5,237,456   8/1993  Yoshioka ............................... 359/649

*Primary Examiner*—F. Daniel Lopez
*Assistant Examiner*—Christopher Verdier

[57]            ABSTRACT

A projection lens system for projecting an enlarged image onto a display screen front an image appearing on a faceplate of a cathode ray tube utilizes at least six lens groups. The first lens group, from an end closest to the display screen, is in a form of a meniscus having a negative power. The second lens group has a weak positive power and a convex surface towards the display screen. The third lens group has a strong positive power. The fourth lens group is bi-convex and has a strong positive power. The fifth lens group has a weak positive power. The sixth lens group has a negative power and a pronounced concave surface away from the display screen. The second and fifth lens groups each are made with plastic lenses with at least aspheric surfaces on one side.

34 Claims, 12 Drawing Sheets

SPHERICAL
ABERRATION

ASTIGMATISM
ω

SPHERICAL
ABERRATION

ASTIGMATISM

SPHERICAL ABERRATION

F 1.05

[mm]

ASTIGMATISM

[mm]

SPHERICAL ABERRATION

F 1.05

[mm]

ASTIGMATISM

[mm]

SPHERICAL ABERRATION

ASTIGMATISM

SPHERICAL ABERRATION

ASTIGMATISM

SPHERICAL ABERRATION

ASTIGMATISM

SPHRICAL ABERRATION

ASTIGMATISM

SPHERICAL ABERRATION

ASTIGMATISM

SPHERICAL ABERRATION

ASTIGMATISM

SPHERICAL ABERRATION

ASTIGMATISM

SPHERICAL ABERRATION

F 1.17

[mm]

ASTIGMATISM

ω 31°

S M

[mm]

SPHERICAL ABERRATION

ASTIGMATISM

PROJECTION LENS SYSTEM

This application is a continuation of application Ser. No. 07/941,380 filed on Sep. 4, 1992, now abandoned.

FIELD OF THE PRESENT INVENTION

The present invention relates to a projection lens system and more particularly relates to a system for use in a projection television which projects an enlarged image of an image appearing on a cathode ray tube.

BACKGROUND OF THE PRESENT INVENTION

In recent years, projection televisions are spreading as a means for producing an image on a large display screen. In attaining the high quality of the image, the performance of the projection lens system plays an important role.

The projection lens system for a projection television needs to have a large aperture ratio (with an F-number close to 1) to secure the brightness. In addition, the projection lens system must be capable of good correction of aberration to a periphery of a projected image on the display screen.

A problem associated with the projection television is its depth, which is larger than the direct-viewing television (ordinary a television set with the cathode ray tube fluorescent surface is seen directly), so a projection lens system with a shorter projection length is desired.

To achieve high image-forming performance, a large aperture ratio, and a large field angle with a conventional projection lens system formed solely of glass lens elements, the number of lens elements and the aperture of the lens system must be increased. The cost of the lens system is therefore increased. Moreover, the weight of the entire lens system is increased.

Furthermore, correction of the performance in the periphery of the screen is difficult. If aspheric plastic lens elements are employed, correction of the aberration in the periphery is facilitated. But if the aspherical amount of the plastic lens element is increased to increase the corrective power, the precision in the fabrication is lowered, and the design performance is not fully realized. In particular, when the aspheric lens is provided near the screen, because of the large light beam diameter, the precision error easily cause aberration, and due to the occurrence of the glare, the contrast is lowered.

SUMMARY OF THE PRESENT INVENTION

An object of the present invention is to provide a projection lens system which is compact and has a smaller depth.

Another object of the present invention is to provide good focusing performance throughout the entire screen area of the projection television.

A further object of the present invention is to provide a projection lens system which is easy to fabricate.

A further object of the present invention is to provide a projection lens system which has a wide field angle and employs aspheric plastic lenses.

A projection lens system according to a first aspect of the present invention comprises six lens groups. The first lens group, from an end closest to the display screen, is in the form of meniscus having a negative power, the second lens group has a convex surface towards the display screen and has a weak positive power, and the third lens group has a strong positive power. The fourth lens group is bi-convex and has a strong positive power, the fifth lens group has a weak positive power, and the sixth lens group has a pronounced concave surface away from the display screen and has a negative power. The second and the fifth lens groups each are made of plastic with aspheric surfaces on both sides.

Preferably, the following condition is satisfied:

$$0.0 < f/f_{12} < 0.15 \tag{1}$$

where f represents the focal length of the overall system, and $f_{12}$ represents the focal length of a combination of the first and the second lens groups.

A projection lens system according to a second aspect of the present invention comprises seven lens groups. The first lens group, from an end closest to the display screen, is in the form of a meniscus having a positive power, the second lens group has a convex surface towards the display screen and has a weak positive power, the third lens group is in the form of meniscus having a negative power, and the fourth lens group is in the form of meniscus having a positive power. The fifth lens group, disposed close to the fourth lens group, is bi-convex and has a positive power. The sixth lens group has a concave surface away from the display screen and has a negative power, and the seventh lens group has a pronounced concave surface away from the display screen and has a negative power. The second and the sixth lens groups each are made of plastic with at least one aspheric surface.

Preferably, the following conditions are satisfied:

$$0.0 < f/f_1 < 0.3 \tag{3}$$

$$-0.4 < f/f_3 < -0.1 \tag{4}$$

$$0.4 < f/f_5 < 0.8 \tag{5}$$

where f represents the focal length of the overall system, $f_1$ represents the focal length of the first lens group, $f_3$ represents the focal length of the third lens group, and $f_5$ represents the focal length of the fifth lens group.

A projection lens system according to a third aspect of the present invention comprises eight lens groups. The first lens group, from an end closest to the display screen, is in the form of a meniscus having a positive power, the second lens group has a convex surface towards the display screen and has a weak positive power, and the third lens group is in the form of a meniscus having a negative power. The fourth lens group is bi-convex and has a positive power. The fifth lens group, disposed close to the fourth lens group, is bi-concave and has a negative power. The sixth lens group is bi-convex and has a positive power. The seventh lens group has a concave surface away from the display screen and has a negative power. The eighth lens group has a pronounced concave surface away from the display screen and has a negative power. The second and the seventh lens groups each are made of plastic with at least one aspheric surface.

BRIEF DESCRIPTION OF THE DRAWINGS

Other objects and advantages of the present invention will become more apparent from the detailed description of the preferred embodiments with reference to the accompanied drawings, wherein.

DETAILED DESCRIPTION OF THE PREFERRED EMBODIMENTS

Preferred embodiments of he present invention will now be described with reference to the drawings.

Figure 1:
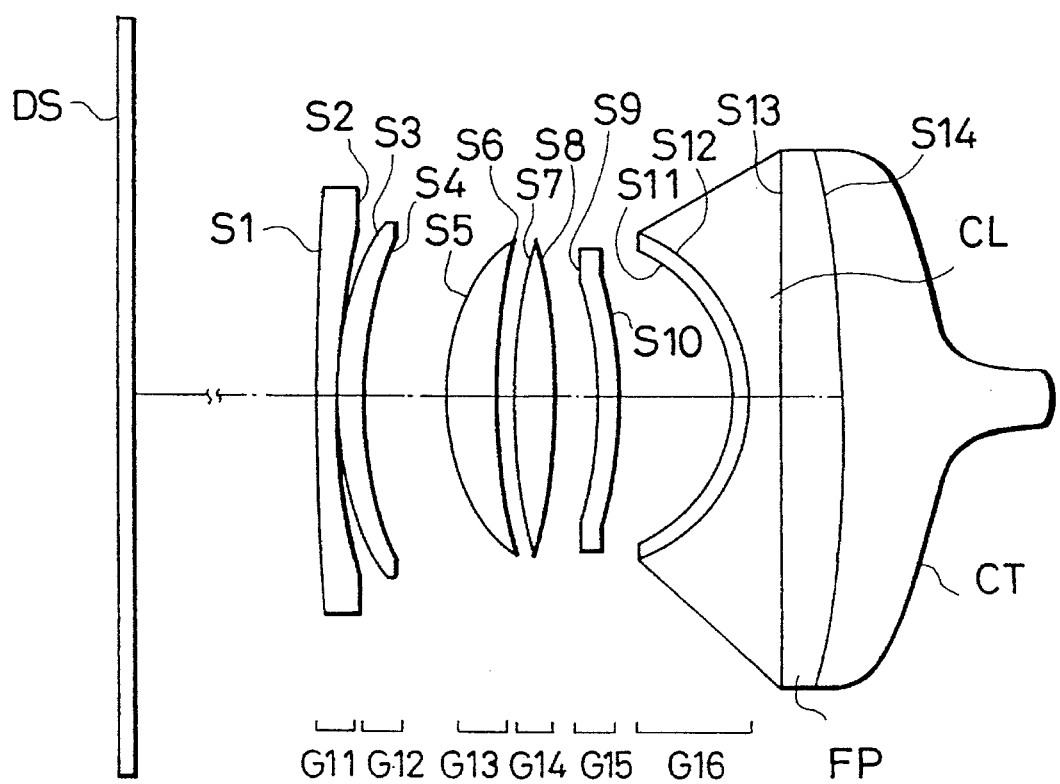
FIG. 1 shows the configuration of a projection lens system of a first embodiment of the present invention.

A projection lens system of a first embodiment of the present invention has a configuration shown in FIG. 1. The projection lens system is for projecting an enlarged image, on a display screen DS, of an image appearing on a faceplate FP of a cathode ray tube CT. The projection lens system includes six lens groups G11 to G16. The lens groups G11 to G16 are called the first to sixth lens groups, respectively, in order as seen from the display screen DS. Each of the lens groups G11 to G16 includes one or several lens elements.

The first lens group G11, from an end closest to the display screen DS, is in the form of meniscus and having negative power refraction surface.

The second lens group G12 includes a plastic lens with aspheric surfaces on both sides. The second lens group G12 has a convex surface towards the display screen DS and a weak positive power refraction surface. The second lens group G12 functions to provide weak convergence and correction of spherical aberration and coma.

Since the first lens group G11 has a negative power, the first lens group G11 has a function for enabling easier correction of spherical aberration and coma by the second lens group G12. The combination of the first and second lens groups G11 and G12 functions to provide weak convergence and precise correction of spherical aberration and coma.

The third lens group G13 has a strong positive power of refraction surface. The fourth lens group G14 has a strong positive power of refraction surface. The third lens group G13 has a convergence function, and the fourth lens group G14 also has a convergence function. The combination of the third and fourth lens groups G13 and G14 provides strong convergence.

The fifth lens group G15 includes a plastic lens with a weak positive power refraction surface. The fifth lens group G15 precisely corrects the astigmatism, distortion, and coma. The fifth lens group G15 has a concave surface away from the display screen DS.

The sixth lens group G16 has a pronounced concave surface away from the display screen DS. The faceplate FP has a spherical fluorescent surface S14 on its inside surface. Together with the cooling liquid CL, the sixth lens group G16 functions to provide correction of curvature which is required for correction of image formation on the fluorescent surface which is concave away from the display screen DS.

Figure 2A:
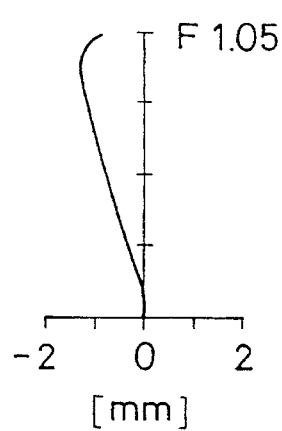
FIG. 2A shows the spherical aberration of the first embodiment.
Figure 2B:
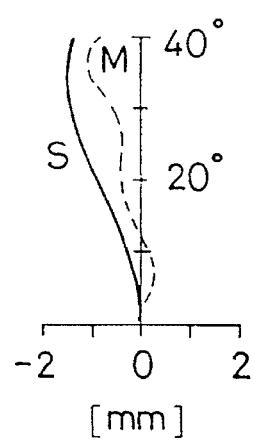
FIG. 2B shows the astigmatism of the first embodiment.

The dimensions, coefficients, and other numerical factors of the lens groups G11 to G16 and the faceplate FP of this embodiment are shown in Table 1.1. The spherical aberration is shown in FIG. 2A, and the astigmatism is shown in FIG. 2B.

In Table 1.1, s1, s2, . . . , s14 denote the surfaces of each lens groups G11 to G16 and the faceplate FP, and R indicates the radii of each surfaces s1, s2, . . . , s14. D indicates the thicknesses of the lens groups G11 to G16 at the center or the spacing between the lens groups. In Table 1.1, the values of D in lines s1, s3, s5, s7, s9, s11, and s13 indicate the thicknesses, while the values of D in lines s2, s4, s6, s8, s10, and s12 indicate the spacings. N denotes the refractive index ($\lambda=543$ nm), and v denotes Abbe's invariant. In addition, the value of magnification is 0.117, and the screen size is 45 inches.

This embodiment satisfies the following condition:

$$0.0 < f/f_{12} < 0.15 \tag{1}$$

where f represents the focal length of the entire lens group system, and $f_{12}$ represents the focal length of a combination of the first and the second lens groups G11 and G12.

The above condition relates to the power of the combination of the first and the second lens groups G11 an G12. If the lower limit is exceeded, the marginal ray height from the optical axis is large, which makes the aperture ratio large. If the upper limit is exceeded, it is difficult to correct spherical aberration, which makes the aspherical amount of the second lens group G12 large.

The aspheric surface included in the lens groups G12 and G15 has a surface of revolution which is described by the following relationship. In other words, the aspheric surface is a set (loci) of points which satisfy the following relationship, in which x denotes a sag, i.e., a distance (of the given point); in the direction of the optical axis, from a flat plane normal to the optical axis and containing the vertex of aspheric surface, and p denotes the distance of the given point from the optical axis.

$$X = \frac{p^2/R}{1 + \{1 - (1+CC) \cdot (p/R)^2\}^{1/2}} + \quad (2)$$

$$A_4 \cdot p^4 + A_6 \cdot p^6 + A_8 \cdot p^8 + A_{10} \cdot p^{10}$$

R denotes the radius of curvature of the surface which is a constant for each surface. CC denotes the aspheric coefficient, and $A_4$, $A_6$, $A_8$, and $A_{10}$ denote the high-order aspheric coefficients.

In this embodiment, the second lens group G12 does not have an inflection point on either surface. A light beam having a large diameter passes through the second lens group G12, but since both surfaces of this lens group G12 do not have the inflection point, it is easy to fabricate the shape exactly identical to the designed shape, so spherical aberration due to fabrication error is very small.

Since the convergence function is achieved by two lens groups G13 and G14, off-axis aberration can be suppressed to a minimum, and the aspherical amount of the fifth lens group G15 can be made small.

The second and the fifth lens groups G12 and G15 are made of plastic with aspheric surfaces on both sides, but the aspherical amount can be restrained to a small value. The lenses are therefore easy to fabricate, and the designed performance can be realized with a high accuracy. Since the lenses have a small amount of power, tolerance in the disposition can be made large, and the defocus, due to temperature variation, is not a practical problem.

The projection lens system of this embodiment has a nominal focal ratio F as large as 1.05 and a field angle ω as large as 40 degrees, and yet it has a good image forming performance. It employs a plastic aspheric lens which is easy to fabricate, so it contributes to increased productivity. It also enables realization of a compact and thin projection television.

Figure 3:
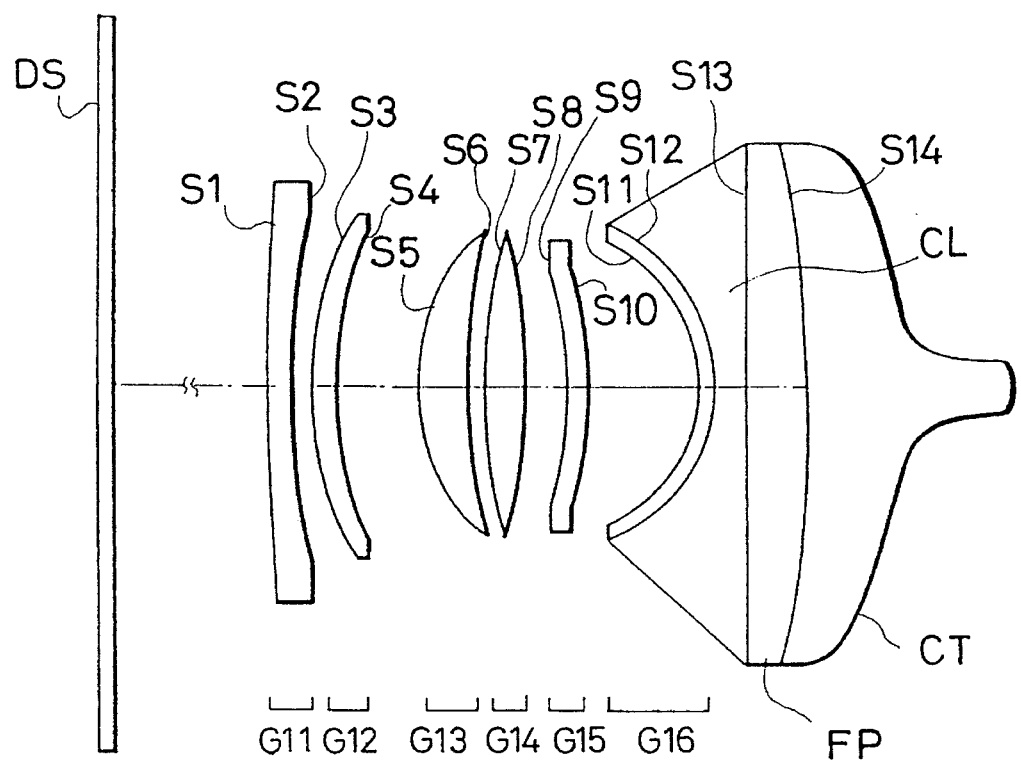
FIG. 3 shows the configuration of a projection lens system of a second embodiment of the present invention.
Figure 4A:
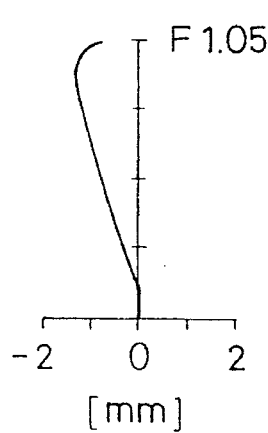
FIG. 4A shows the spherical aberration of the second embodiment.
Figure 4B:
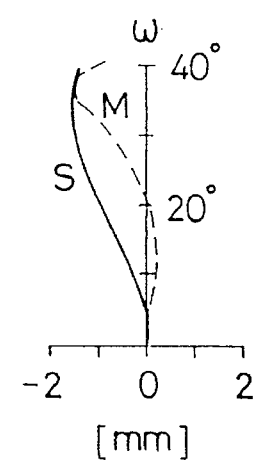

A projection lens system of a second embodiment of the present invention has a configuration as shown in FIG. 3. The dimensions, coefficients, and other numerical factors of the lens groups G11 to G16 and the faceplate of this embodiment are shown in Table 1.2. The spherical aberration is shown in FIG. 4A, and the astigmatism is shown in FIG. 4B. Except for these differences, the structure of the projection lens system of this embodiment is the same as the first embodiment.

Figure 5A:
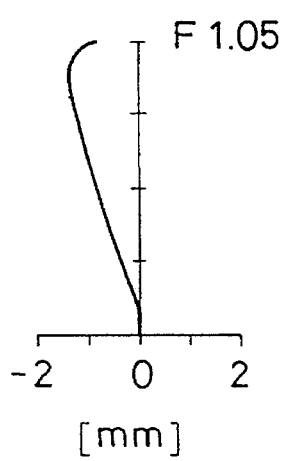
FIG. 5A shows the spherical aberration of a third embodiment of the present invention.
Figure 5B:
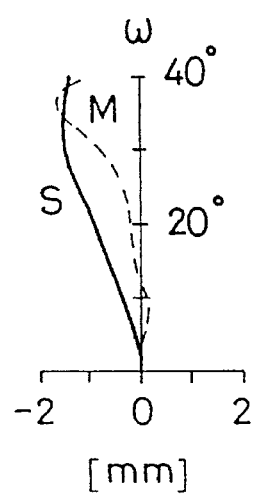
FIG. 5B shows astigmatism of the third embodiment.

The dimensions, coefficients and other numerical factors of the lens groups G11 to G16 and the faceplate FP of a third embodiment are shown in Table 1.3. The spherical aberration is shown in FIG. 5A, and the astigmatism is shown in FIG. 5B. Except for these differences, the structure of the projection lens system of this embodiment is the same as the first embodiment.

Figure 6A:
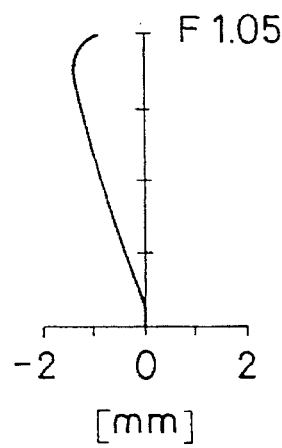
FIG. 6A shows a spherical aberration of a fourth embodiment of the present invention.
Figure 6B:
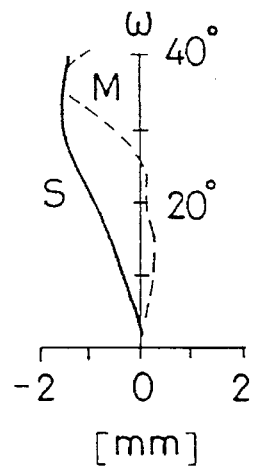
FIG. 6B shows astigmatism of the fourth embodiment.

The dimensions, coefficients, and other numerical factors of the lens groups G11 to G16 and the faceplate FP of a fourth embodiment are shown in Table 1.4. The spherical aberration is shown in FIG. 6A, and the astigmatism is shown in FIG. 6B. Except for these differences, the structure of the projection lens system of this embodiment is the same as the first embodiment.

Figure 7:
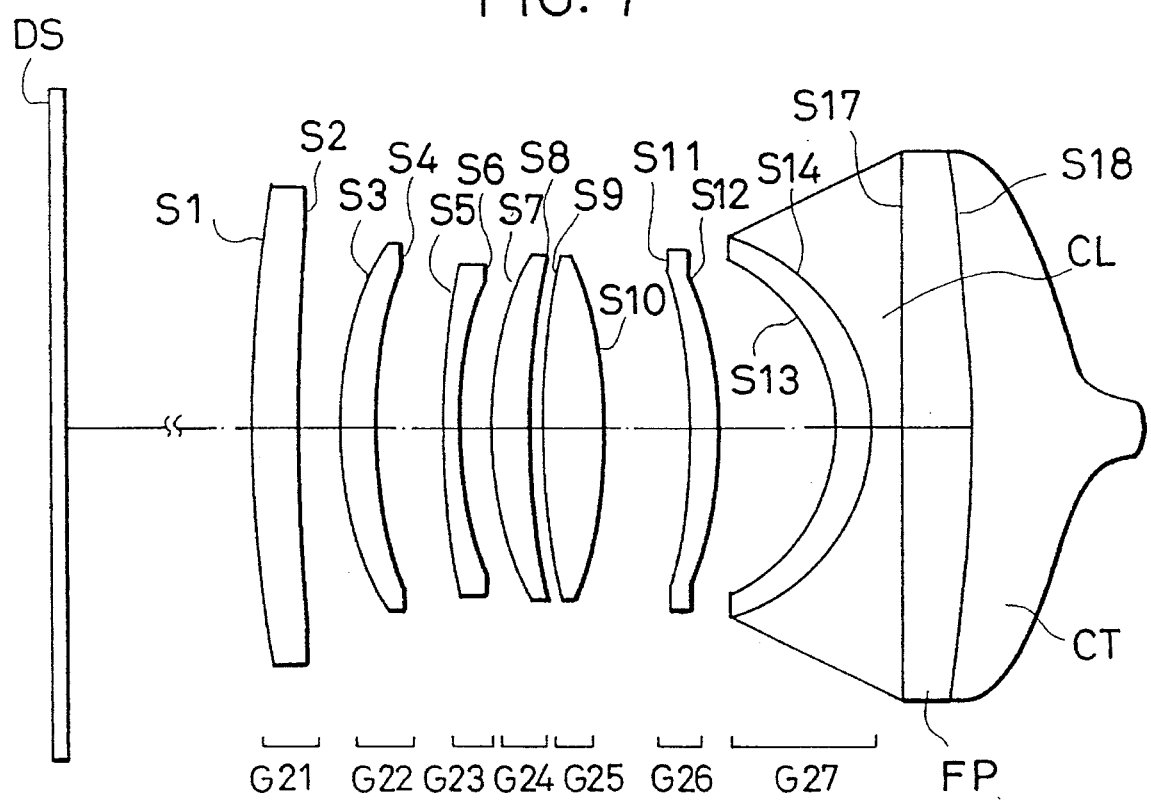
FIG. 7 shows the configuration of a projection lens system of a fifth embodiment of the present invention.

A projection lens system of a fifth embodiment of the present invention has a configuration shown in FIG. 7. The projection lens system of this embodiment includes seven lens groups G21 to G27. The groups G21 to G27 are called the first to seventh lens groups, respectively, in the order as seen from the display screen DS. Each of the lens groups G21 to G27 includes one or several lens elements.

The first lens group G21, from an end closest to the display screen DS, is in the form of a meniscus having a positive power refraction surface.

The second lens group G22 includes a plastic lens with aspheric surfaces on both sides. The second lens group G22 has a convex surface towards the display screen DS and a positive power of refraction surface. The second lens group G22 has functions to provide weak convergence and precise correction of spherical aberration and coma.

The third lens group G23 is in the form of a meniscus having a negative power of refraction surface. The third lens group G23 function to provide of precise correction of spherical aberration and coma.

The fourth lens group G24 is in the form of a meniscus having a positive power refraction surface.

The fifth lens group G25, disposed near the fourth lens group G24, has positive power refraction surfaces and is bi-convex.

The sixth lens group G26 includes a plastic lens which is concaved away from the display screen DS. The sixth lens group G26 functions to provide precise correction of astigmatism, spherical aberration, and coma.

The seventh lens group G27 has a pronounced concave surface away from the display screen DS. The faceplate FP has a spherical fluorescent surface on its inside surface. Together with a cooling liquid CL, the seventh lens group G27 functions to provide correction of the curvature which is required for correction of image formation on the fluorescent surface which is concaved away from the display screen DS.

Figure 8A:
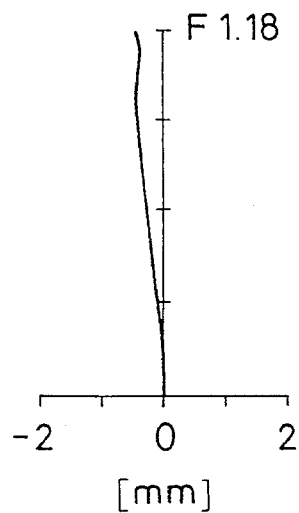
FIG. 8A shows a spherical aberration of the fifth embodiment.
Figure 8B:
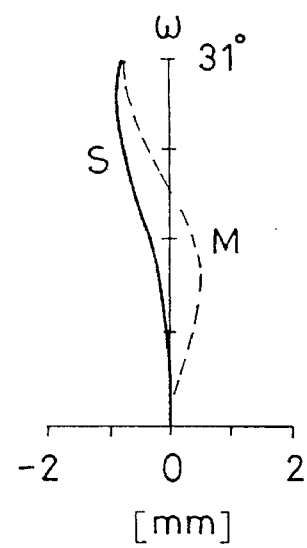
FIG. 8B shows the astigmatism of the fifth embodiment.

The dimensions, coefficients, and other numerical factors of the lens groups G21 to G27 and the faceplate FP of this embodiment are shown in Table 2.1. The spherical aberration is shown in FIG. 8A, and the astigmatism is shown in FIG. 8B.

In Table 2.1, s1, s2, ..., s14 denote the surfaces of each lens groups G21 to G27, and s17 and s18 denote the surfaces of the faceplate FP. Furthermore, R indicates the radii of the each surface and D indicates the thicknesses of the lens groups G21 to G27 at the center or the spacings between the lens groups. In Table 2.1, the values of D in lines s1, s3, s5, s7, s9, s11, s13, and s17 indicate the thicknesses, while the values of D in lines s2, s4, s6, s8, s10, s12 and s14 indicate the spacings. N denotes the refractive index (λ=543 nm), and ν denotes Abbe's invariant.

This embodiment satisfies the following conditions:

$$0.0 \leq f/f_1 < 0.3 \quad (3)$$

$$-0.4 < f/f_3 < -0.1 \quad (4)$$

$$0.4 < f/f_5 < 0.8 \quad (5)$$

where f represents the focal length of the entire lens group system, $f_1$ represents the focal length of the first lens group G21, $f_3$ represents the focal length of the third lens group G23, and $f_5$ represents the focal length of the fifth lens group G25.

The above condition (3) relates to the power of the first lens group G21. If the upper limit is exceeded, correction of off-axis aberration, particularly coma, is difficult. If the lower limit is exceeded, correction of off-axis aberration, particularly coma, is difficult. This will necessitate increased power of the second lens group G22 formed of a plastic lens element.

The above condition (4) relates to the power of the third lens group G23 and is required to balance spherical aberration with the first and the second lens groups G21 and G22.

The above condition (5) relates to the power of the fifth lens group G25. When time lower limit is exceeded, the power of the fourth lens group G24 has to be enhanced, which will in turn make it difficult to correct the coma. When the upper limit is exceeded, it is difficult to secure light quantity at the periphery.

The aspheric surface included in the lens group G22 and G27 has a surface of revolution which is described by above-mentioned equation (2).

In this embodiment, the second lens group G22 does not have an inflection point on either surface. A light beam having a large diameter passes through the second lens group G22, but since both surfaces of this lens group G22 do not have an inflection point, it is easy to fabricate the shape exactly identical to the designed shape, so spherical aberration due to fabrication error is very small.

Since the convergence function is achieved by two lens groups G24 and G25, off-axis aberration can be suppressed to a minimum, and the aspherical amount of the sixth lens group G26 can be made small.

The second and sixth lens groups G22 and G26 are made of plastic with aspheric surface on both sides, but the aspherical amount can be restrained to a small value. The lenses are therefore easy to fabricate, and the designed performance can be realized with a high accuracy. Since the lenses have only a little power, tolerance in the disposition can be made large, and the defocus, due to temperature variation, is not a problem in practice.

The projection lens system of this embodiment has field angle ω as large as 31 degrees, and yet it has good image forming performance. It employs a plastic aspheric lens which is easy to fabricate, so it contributes to increased productivity. It also enables realization of a compact and thin projection television.

Figure 9:
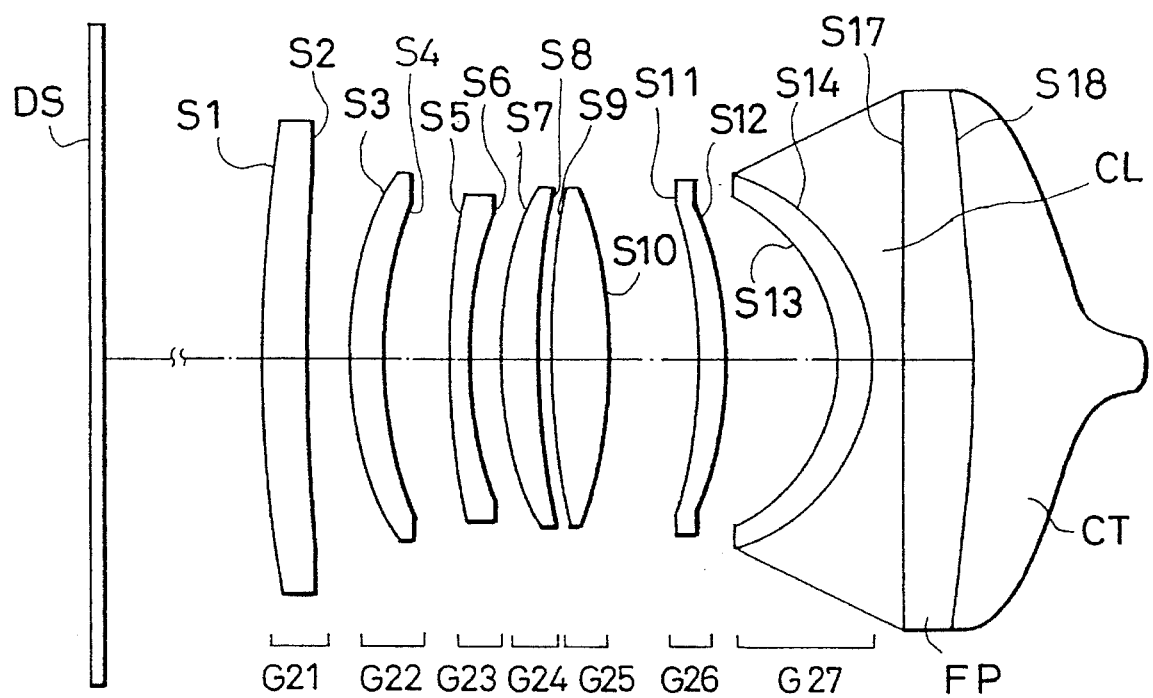
FIG. 9 shows the configuration of a projection lens system of a sixth embodiment of the present invention.
Figure 10A:
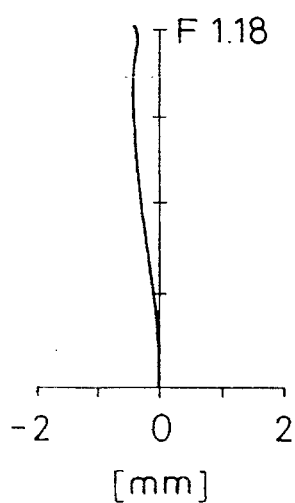
FIG. 10A shows the spherical aberration of the sixth embodiment.
Figure 10B:
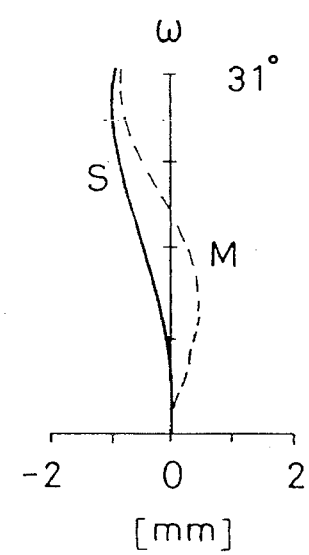
FIG. 10B shows the astigmatism of the sixth embodiment.

A projection lens system of a sixth embodiment of the present invention has a configuration as shown in FIG. 9. The dimensions, coefficients, and other numerical factors of the lens groups G21 to G27 and the faceplate FP of the embodiment are shown in Table 2.2. The spherical aberration is shown in FIG. 10A, and the astigmatism is shown in FIG. 10B. Except for these differences, the structure of the projection lens system off this embodiment is the same as the fifth embodiment.

Figure 11:
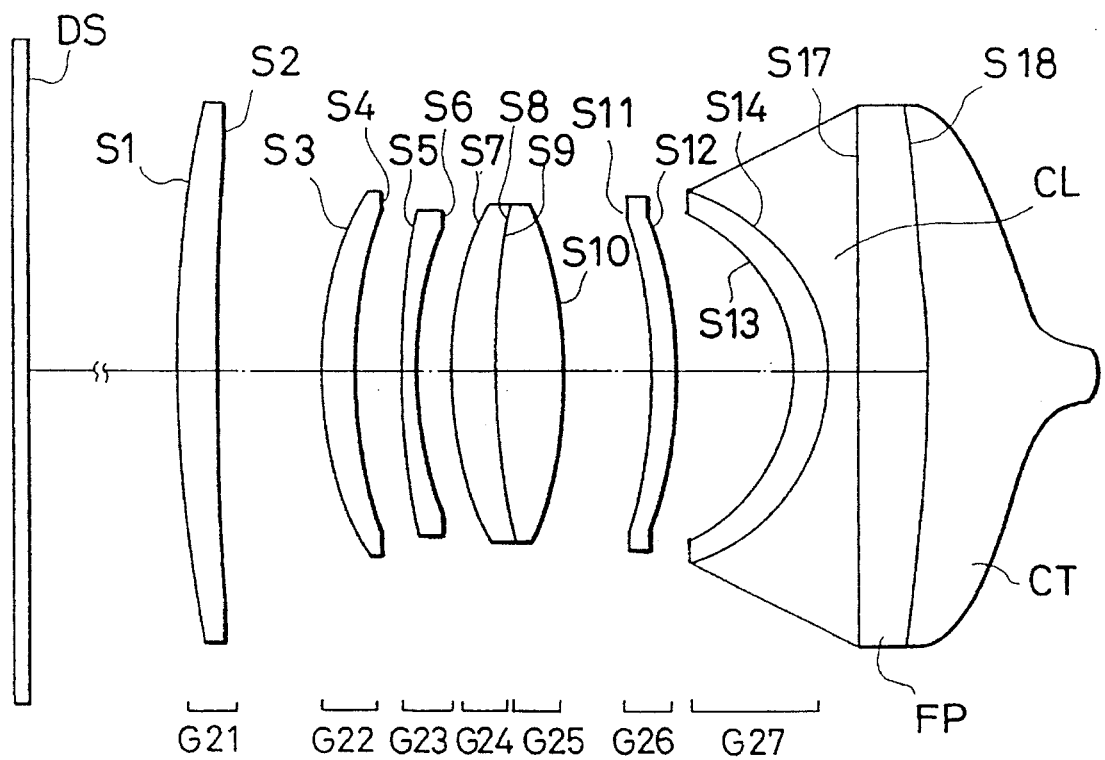
FIG. 11 shows the configuration of a projection lens system of a seventh embodiment of the present invention.
Figure 12A:
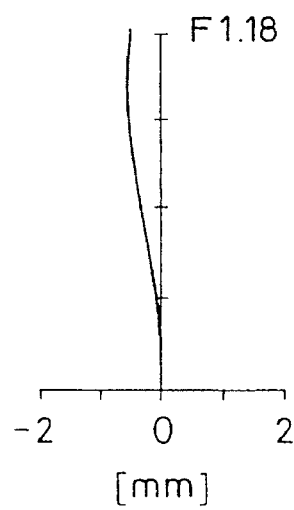
FIG. 12A shows a spherical aberration of the seventh embodiment.
Figure 12B:
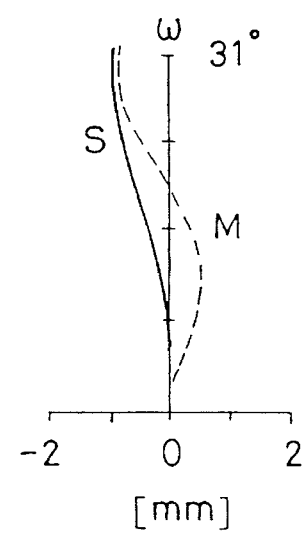
FIG. 12B shows the astigmatism of the seventh embodiment.

A projection lens system of a seventh embodiment of the present invention has a configuration as shown in FIG. 11. The dimensions, coefficients, and other numerical factors of the lens groups G21 to G27 and the faceplate FP of this embodiment are shown in Table 2.3. The spherical aberration is shown in FIG. 12A, and the astigmatism is shown in FIG. 12B. Except for these differences, the structure of the projection lens system of this embodiment is the same as the fifth embodiment.

Figure 13:
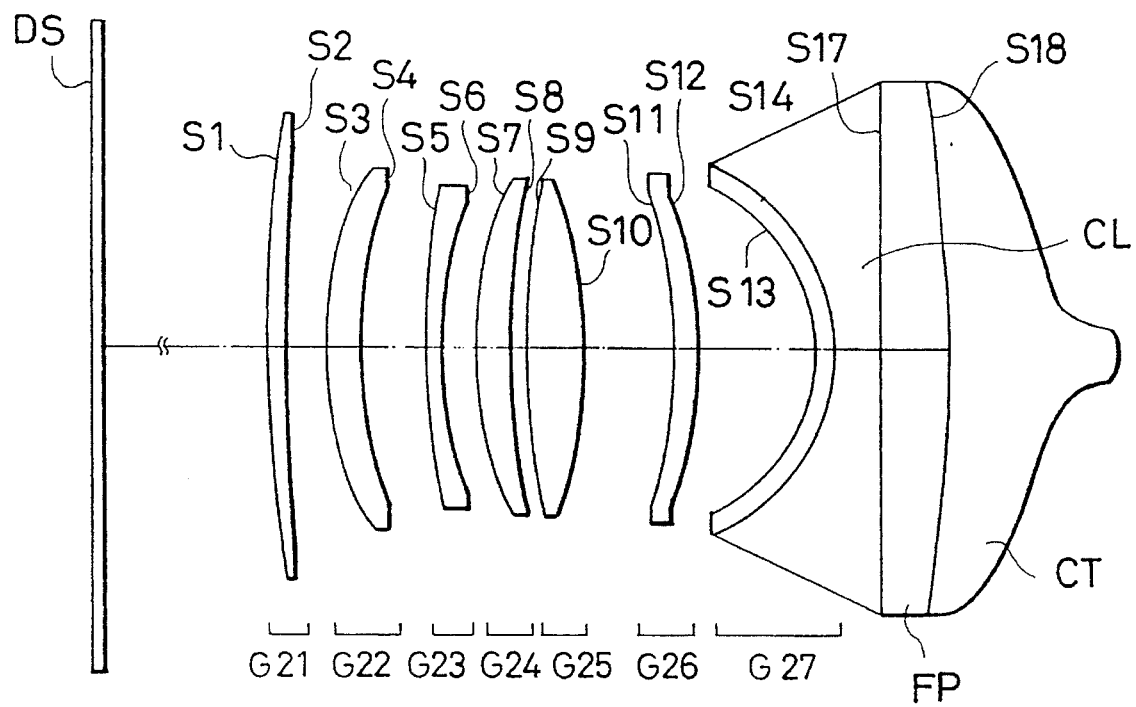
FIG. 13 shows the configuration of a projection lens system of an eighth embodiment of the present invention.
Figure 14A:
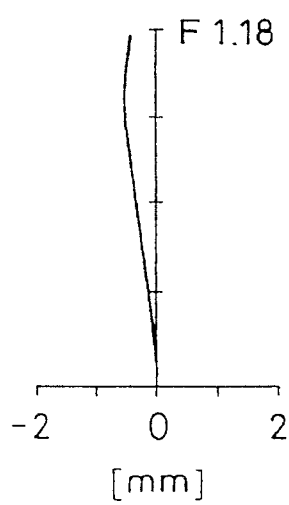
FIG. 14A shows the spherical aberration of the eighth embodiment.
Figure 14B:
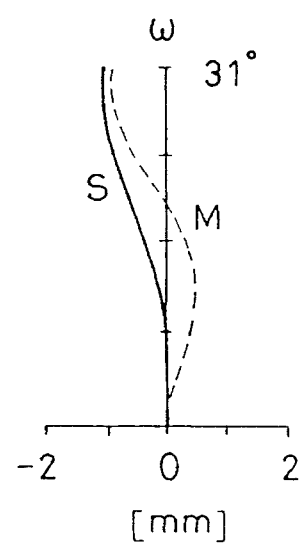
FIG. 14B shows the astigmatism of the eighth embodiment.

A projection lens system of an eighth embodiment of the present invention has a configuration shown in FIG. 13. The dimensions, coefficients, and other numerical factors of the lens groups G21 to G27 and the faceplate FP of this embodiment are shown in Table 2.4. The spherical aberration is shown in FIG. 14A, and the astigmatism is shown in FIG. 14B. Except for these differences, the structure of the projection lens system of this embodiment is the same as the fifth embodiment.

Figure 15:
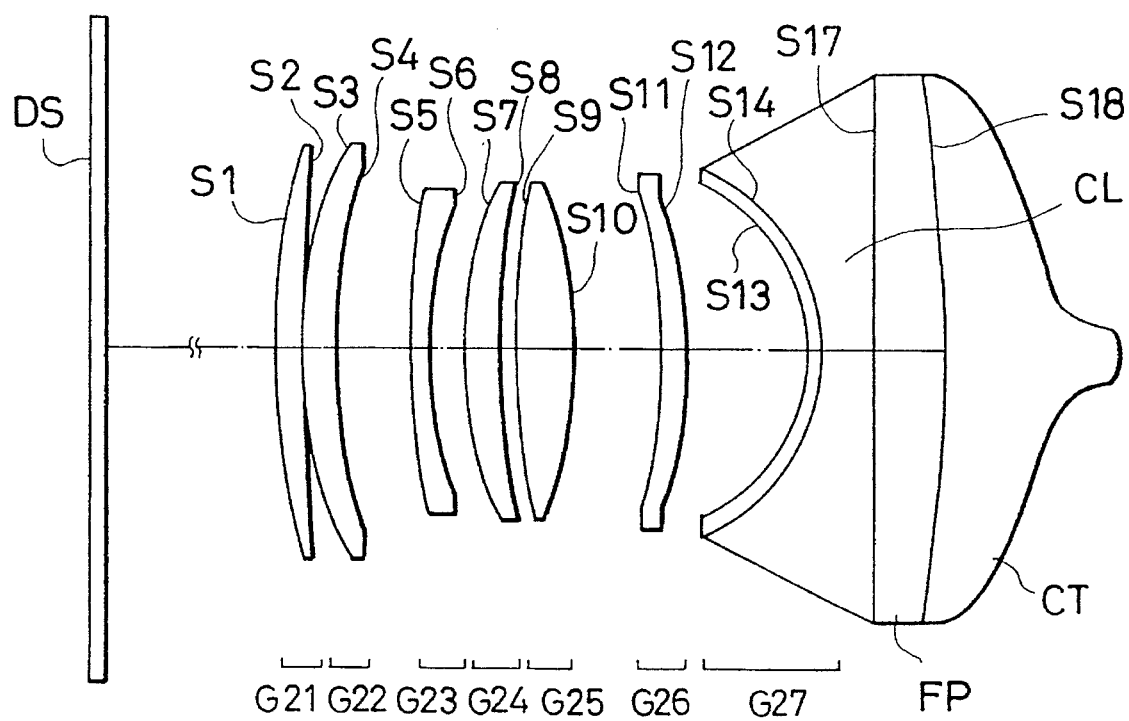
FIG. 15 shows the configuration of a projection lens system of a ninth embodiment of the present invention.
Figure 16A:
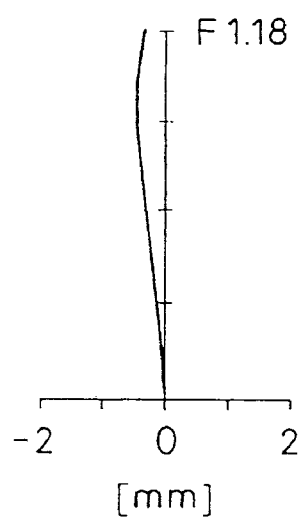
FIG. 16A shows the spherical aberration of the ninth embodiment.
Figure 16B:
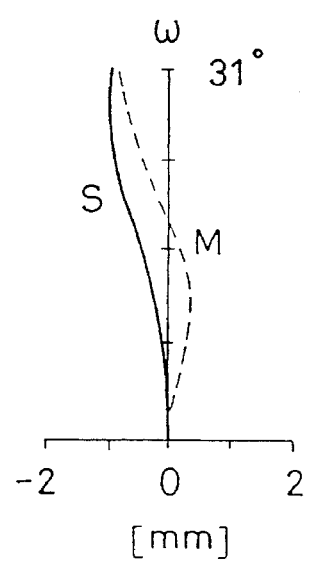
FIG. 16B shows the astigmatism of the ninth embodiment.

A projection lens system of a ninth embodiment of the present invention has a configuration as shown in FIG. 15. The dimensions, coefficients, and other numerical factors of the lens groups G21 to G27 and the faceplate FP of this embodiment are shown in Table 2.5. The spherical aberration is shown in FIG. 16A, and the astigmatism is shown in FIG. 16B. Except for these differences, the structure of the projection lens system of this embodiment is the same as the fifth embodiment.

Figure 17:
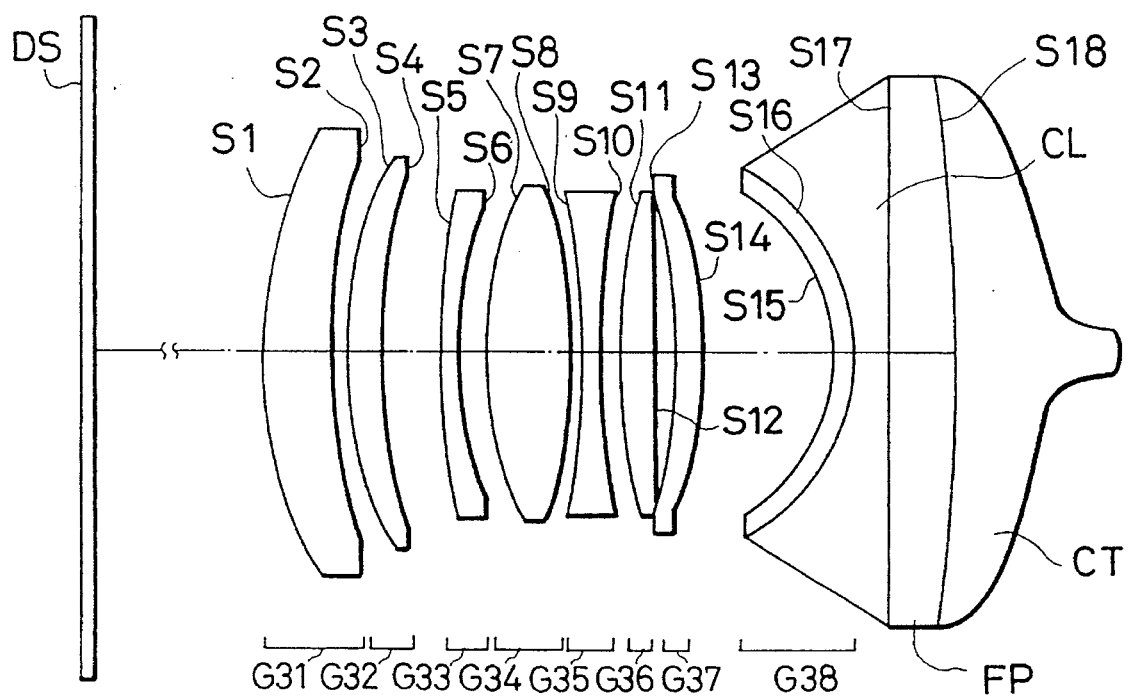
FIG. 17 shows the configuration of a projection lens system of a tenth embodiment of the present invention.

A projection lens system of a tenth embodiment of the present invention has a configuration as shown in FIG. 17. The projection lens system of this embodiment includes eight lens groups G31 to G38. The groups G31 to G38 are called the first to eighth lens groups, respectively, in the order as seen from the display screen DS. Each of lens groups G31 to G38 includes one or several lens elements.

The configuration of this embodiment as shown in FIG. 17 is similar to that of the embodiment shown in FIG. 7. The lens groups G31, G32, and 633 in FIG. 17 respectively corresponds to the lens groups G21, G22, and G23 in FIG. 7. The first lens group G31 is in the form of a meniscus having a positive power of refraction surface. The second lens group G32 includes a positive plastic lens, with aspheric surfaces on both sides, and has a convex surface toward the display screen DS. The third lens group G33 is in the form of a meniscus having a negative power of refraction surface.

The lens groups G37 and G38 in FIG. 17 respectively corresponds to the lens groups G26 and G27 in FIG. 7. The seventh lens group G37 includes a plastic lens and is concaved away from the display screen DS. The eighth lens group G38 has a pronounced concave surface away from the display screen DS.

In this embodiment, the convergence function is achieved by a combination of three lens groups G34 to G36 as shown in FIG. 17, instead of two lens groups G24 and G25 in FIG. 7. The fourth lens group G34 is bi-convex and has a positive power of refraction surface. The fifth lens group G35, disposed near the fourth lens group G34, is bi-concave. The sixth lens group G36, disposed near the seventh lens group G37, is bi-convex and has a positive power of refraction surface.

Except that the convergence function is achieved by a combination of three lens groups G34 to G36 instead of two lens groups G24 and G25, the projection lens system of this embodiment functions in the same manner as the fifth embodiment.

Figure 18A:
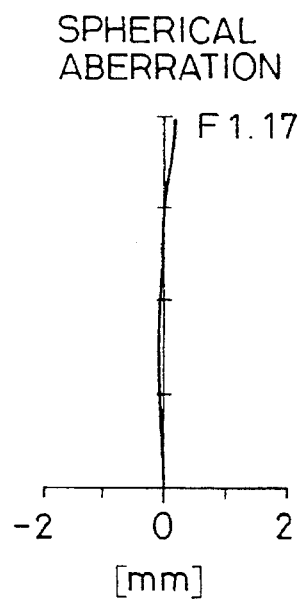
FIG. 18A shows a spherical aberration of the tenth embodiment.
Figure 18B:
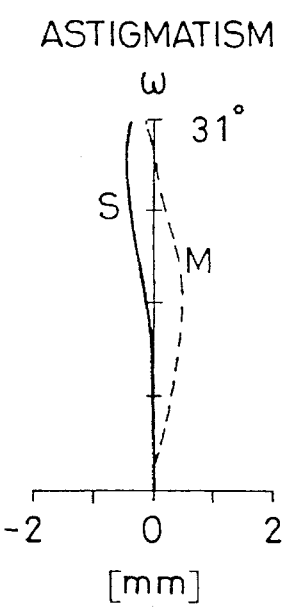
FIG. 18B shows astigmatism of the tenth embodiment.

The dimensions, coefficients, and other numerical factors of the lens groups G31 to G38 and the faceplate FP of this embodiment are shown in Table 3.1. The spherical aberration is shown in FIG. 18A, and the astigmatism is shown in FIG. 18B.

Figure 19:
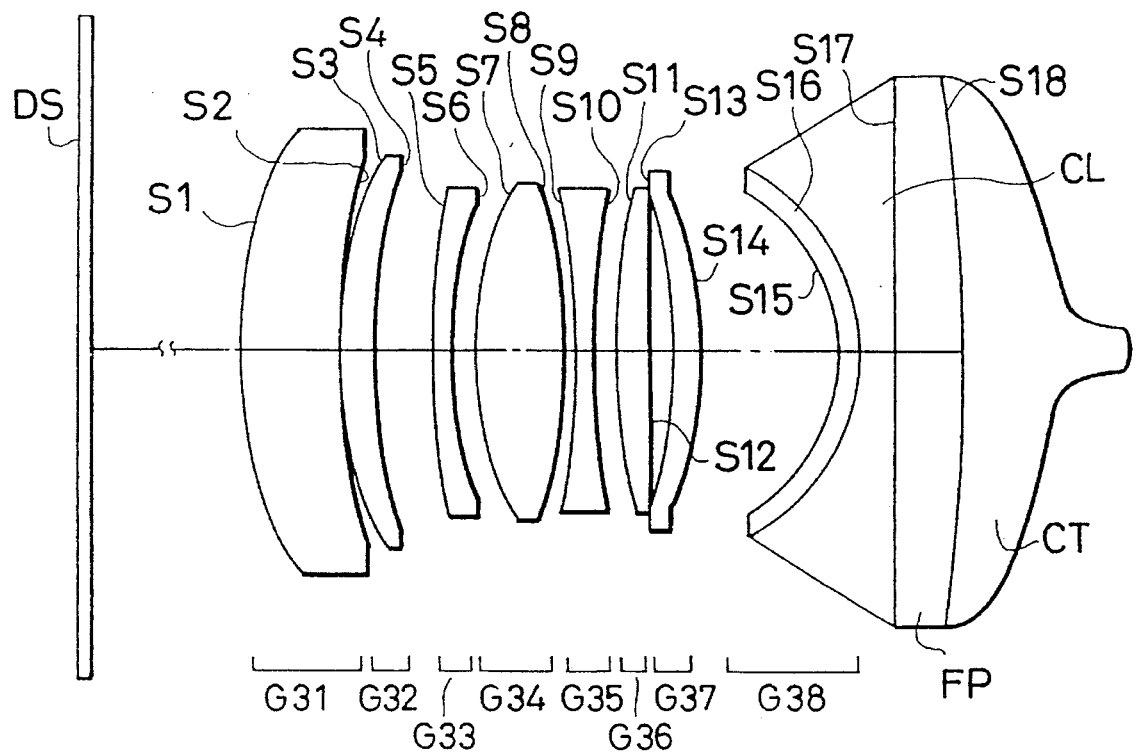
FIG. 19 shows the configuration of a projection lens system of an eleventh embodiment of the present invention.
Figure 20A:
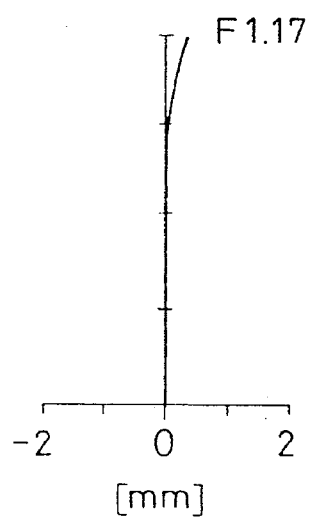
FIG. 20A shows the spherical aberration of the eleventh embodiment.
Figure 20B:
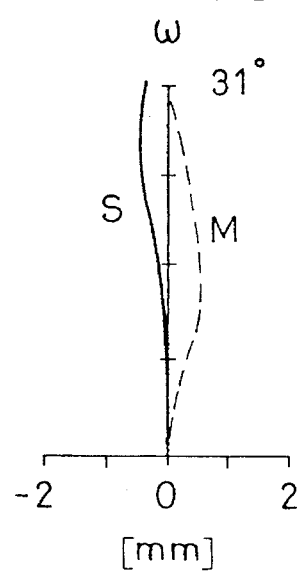
FIG. 20B shows astigmatism of the eleventh embodiment.

A projection lens system of an eleventh embodiment of the present invention has a configuration as shown in FIG. 19. The dimensions, coefficients, and other numerical factors of the lens groups G31 to G38 and the faceplate FP of this embodiment are shown in Table 3.2. The spherical aberration is shown in FIG. 20A, and the astigmatism is shown in FIG. 20B. Except for these differences, the structure of the projection lens system of this embodiment is the same as the tenth embodiment.

Figures 21, 22A, 22B:
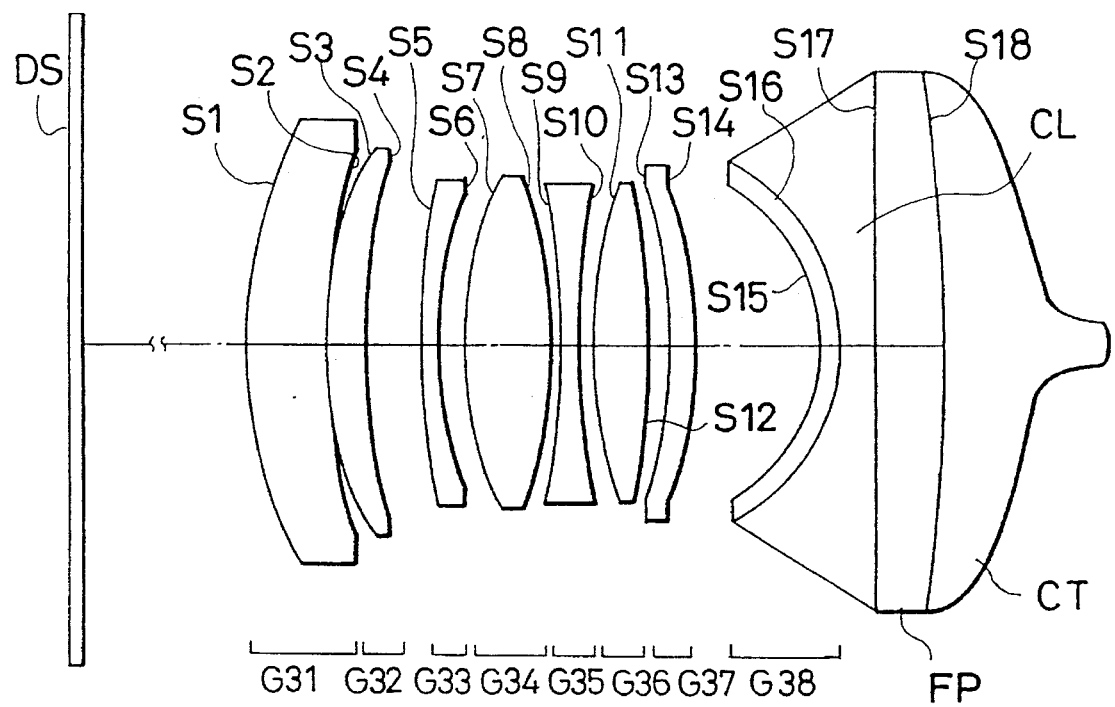
FIG. 21 shows the configuration of a projection lens system of a twelfth embodiment of the present invention.
FIG. 22A shows a spherical aberration of the twelfth embodiment.
FIG. 22B shows astigmatism of the twelfth embodiment.

A projection lens system of an twelfth embodiment of the present invention has a configuration as shown in FIG. 21. The dimensions, coefficients, and other numerical factors of the lens groups G31 to G38 and the faceplate FP of this embodiment are shown in Table 3.2. The spherical aberration is shown in FIG. 22A, and the astigmatism is shown in FIG. 22B. Except for these differences, the structure of the projection lens system of this embodiment is the same as the tenth embodiment.

Figure 23:
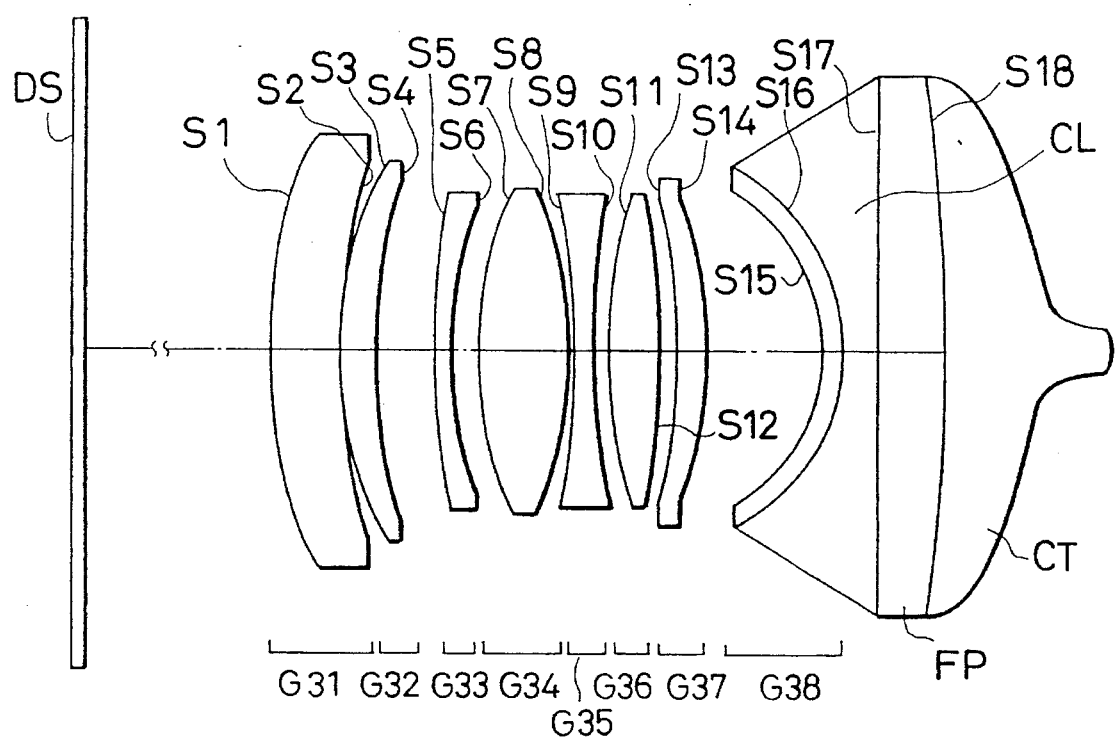
FIG. 23 shows the configuration of a projection lens system of a thirteenth embodiment of the present invention.
Figure 24A:
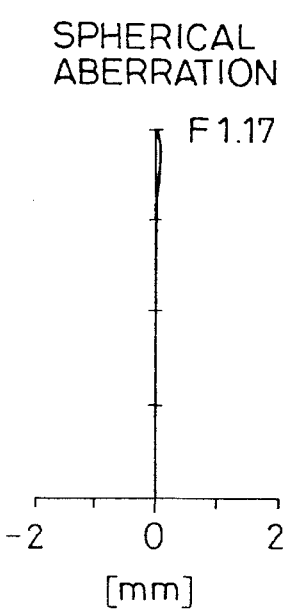
FIG. 24A shows a spherical aberration of the thirteenth embodiment.
Figure 24B:
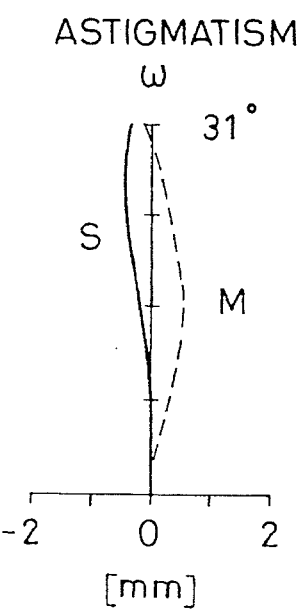
FIG. 24B shows astigmatism of the thirteenth embodiment.

A projection lens system of a thirteenth embodiment of the present invention has a configuration as shown in FIG. 23. The dimensions, coefficients, and other numerical factors of the lens groups G31 to G38 and the faceplate FP of this embodiment are shown in Table 3.4. The spherical aberration is shown in FIG. 24A, and the astigmatism is shown in FIG. 24B. Except for these differences, the structure of the projection lens system of this embodiment is the same as the tenth embodiment.

The overall operation of the preferred embodiments of the present invention is to provide a projection lens system which is small, easy to construct, and compact, but which provides a focused picture over the entire area of display. Moreover, the preferred embodiments utilize a wide field angle and aspheric plastic lenses to achieve a high quality picture.

While only certain embodiments of the present invention have been described, it will be apparent to those skilled in the art that various changes and modifications may be made therein without departing from the spirit and scope of the present invention as set forth in the claims below.

TABLE 1.1

|   |     | R        | D     | N       | ν    |
|---|-----|----------|-------|---------|------|
| G11 | S1  | 461.24   | 5.00  | 1.62443 | 36.4 |
|   | S2  | 170.00   | 5.51  |         |      |
| G12 | S3  | 63.95    | 6.00  | 1.49425 | 55.4 |
|   | S4  | 101.48   | 19.63 |         |      |
| G13 | S5  | 59.88    | 13.24 | 1.59161 | 61.3 |
|   | S6  | 17721.89 | 7.68  |         |      |
| G14 | S7  | 289.45   | 7.49  | 1.59161 | 61.3 |
|   | S8  | −175.78  | 9.99  |         |      |
| G15 | S9  | −124.26  | 6.00  | 1.49425 | 55.4 |
|   | S10 | −69.23   | 26.45 |         |      |
| G16 | S11 | −41.35   | 3.77  | 1.62443 | 36.4 |
|   | S12 | −44.77   | 7.10  | 1.42601 | 73.2 |
| FP  | S13 | INF      | 14.10 | 1.53980 | 56.6 |
|   | S14 | −350.00  |       |         |      |

ASPHERICAL COEFFICIENTS

|     | S3            | S4            | S9            | S10           | S11           |
|-----|---------------|---------------|---------------|---------------|---------------|
| CC  | −0.528055     | −0.789001     | 4.919555      | −3.348428     | 0.414488      |
| A4  | −0.152133E-06 | 0.521906E-06  | −0.878384E-06 | −0.134900E-06 | −0.409798E-05 |
| A6  | −0.157891E-08 | −0.695622E-09 | 0.163899E-08  | 0.131070E-08  | 0.793010E-08  |
| A8  | 0.839748E-12  | 0.355554E-12  | 0.279492E-11  | 0.318671E-11  | −0.829132E-11 |
| A10 | −0.870300E-16 | 0.196557E-15  | −0.181699E-14 | −0.127421E-14 | 0.342808E-14  |

TABLE 1.2

|   |     | R        | D     | N       | ν    |
|---|-----|----------|-------|---------|------|
| G11 | S1  | 370.46   | 5.54  | 1.62443 | 36.4 |
|   | S2  | 153.91   | 0.18  |         |      |
| G12 | S3  | 58.75    | 6.00  | 1.49425 | 55.4 |
|   | S4  | 111.72   | 18.11 |         |      |
| G13 | S5  | 58.41    | 11.61 | 1.59161 | 61.3 |
|   | S6  | 308.14   | 5.63  |         |      |
| G14 | S7  | 259.51   | 8.30  | 1.59161 | 61.3 |
|   | S8  | −139.10  | 10.20 |         |      |
| G15 | S9  | −117.71  | 6.00  | 1.49425 | 55.4 |
|   | S10 | −67.00   | 25.54 |         |      |
| G16 | S11 | −38.61   | 3.77  | 1.62443 | 36.4 |
|   | S12 | −38.76   | 7.10  | 1.42601 | 73.2 |
| FP  | S13 | INF      | 14.10 | 1.53980 | 56.6 |
|   | S14 | −350.00  |       |         |      |

ASPHERICAL COEFFICIENTS

|     | S3            | S4            | S9            | S10           | S11           |
|-----|---------------|---------------|---------------|---------------|---------------|
| CC  | −0.432574     | 0.682005      | 7.411288      | −3.168218     | 0.286976      |
| A4  | 0.588338E-07  | 0.832510E-06  | −0.883314E-06 | −0.348740E-06 | −0.344447E-05 |
| A6  | −0.178293E-08 | −0.118000E-08 | 0.145320E-08  | 0.493225E-09  | 0.521871E-08  |
| A8  | 0.886998E-12  | 0.665665E-12  | 0.198898E-11  | 0.272520E-11  | 0.579806E-11  |
| A10 | −0.126176E-15 | 0.115802E-15  | −0.586198E-15 | −0.184828E-15 | 0.280143E-14  |

TABLE 1.3

|  |  | R | D | N | ν |
|---|---|---|---|---|---|
| G11 | S1 | 267.13 | 5.54 | 1.62443 | 36.4 |
|  | S2 | 156.51 | 0.18 |  |  |
| G12 | S3 | 60.37 | 6.00 | 1.49425 | 55.4 |
|  | S4 | 89.41 | 19.11 |  |  |
| G13 | S5 | 58.22 | 11.61 | 1.59161 | 61.3 |
|  | S6 | 404.13 | 6.62 |  |  |
| G14 | S7 | 218.16 | 8.30 | 1.59161 | 61.3 |
|  | S8 | −157.64 | 9.71 |  |  |
| G15 | S9 | −127.20 | 6.00 | 1.49425 | 55.4 |
|  | S10 | −68.62 | 25.96 |  |  |
| G16 | S11 | −39.55 | 3.77 | 1.62443 | 36.4 |
|  | S12 | −43.54 | 7.10 | 1.42601 | 73.2 |
| FP | S13 | INF | 14.10 | 1.53980 | 56.6 |
|  | S14 | −350.00 |  |  |  |

ASPHERICAL COEFFICIENTS

|  | S3 | S4 | S9 | S10 | S11 |
|---|---|---|---|---|---|
| CC | −0.680527 | −1.022230 | 9.005174 | −3.355078 | 0.347999 |
| A4 | −0.116315E-06 | 0.545047E-06 | −0.623183E-06 | −0.103191E-06 | −0.376926E-05 |
| A6 | −0.192646E-08 | −0.106847E-08 | 0.165962E-08 | 0.993971E-09 | 0.705343E-08 |
| A8 | 0.921496E-12 | 0.463669E-12 | 0.253944E-11 | 0.296580E-11 | −0.801936E-11 |
| A10 | −0.883314E-16 | 0.239412E-15 | −0.130949E-14 | −0.770701E-15 | 0.377622E-14 |

25

TABLE 1.4

|  |  | R | D | N | ν |
|---|---|---|---|---|---|
| G11 | S1 | 273.59 | 5.54 | 1.62443 | 36.4 |
|  | S2 | 161.39 | 0.18 |  |  |
| G12 | S3 | 60.58 | 6.00 | 1.49425 | 55.4 |
|  | S4 | 85.14 | 18.55 |  |  |
| G13 | S5 | 58.54 | 11.61 | 1.59161 | 61.3 |
|  | S6 | 399.48 | 6.77 |  |  |
| G14 | S7 | 194.92 | 8.71 | 1.59161 | 61.3 |
|  | S8 | −160.79 | 9.86 |  |  |
| G15 | S9 | −122.49 | 6.00 | 1.49425 | 55.4 |
|  | S10 | −67.27 | 26.12 |  |  |
| G16 | S11 | −39.98 | 3.77 | 1.62443 | 36.4 |
|  | S12 | −43.82 | 7.10 | 1.42601 | 73.2 |
| FP | S13 | INF | 14.10 | 1.53980 | 56.6 |
|  | S14 | −350.00 |  |  |  |

ASPHERICAL COEFFICIENTS

|  | S3 | S4 | S9 | S10 | S11 |
|---|---|---|---|---|---|
| CC | −0.947270 | −1.991047 | 8.294777 | −2.996045 | 0.361044 |
| A4 | −0.350375E-06 | 0.326860E-06 | −0.537153E-06 | −0.425158E-07 | −0.346948E-05 |
| A6 | −0.192018E-08 | −0.105073E-08 | 0.156844E-08 | 0.114049E-08 | 0.596141E-08 |
| A8 | 0.950511E-12 | 0.517851E-12 | 0.274623E-11 | 0.292992E-11 | −0.659211E-11 |
| A10 | −0.842531E-16 | 0.222091E-15 | −0.148515E-14 | −0.931682E-15 | 0.303604E-14 |

TABLE 2.1

|  |  | R | D | N | ν |
|---|---|---|---|---|---|
|  | OBJ | INF | 1020.37 |  |  |
| G21 | S1 | 196.90804 | 10.69 | 1.591613 | 61.3 |
|  | S2 | 457.54365 | 8.55 |  |  |
| G22 | S3 | 77.35043 | 6.63 | 1.494250 | 55.4 |
|  | S4 | 137.85712 | 14.86 |  |  |
| G23 | S5 | 179.90838 | 3.23 | 1.624421 | 36.4 |
|  | S6 | 90.38261 | 8.17 |  |  |
| G24 | S7 | 74.14915 | 9.56 | 1.591617 | 61.3 |
|  | S8 | 303.97694 | 3.13 |  |  |
| G25 | S9 | 283.05781 | 11.05 | 1.518881 | 64.2 |

TABLE 2.1-continued

|     |     |            |       |          |      |
|-----|-----|------------|-------|----------|------|
|     | S10 | −104.11349 | 18.72 |          |      |
| G26 | S11 | −111.94447 | 6.53  | 1.494250 | 55.4 |
|     | S12 | −67.33752  | 25.16 |          |      |
| G27 | S13 | −40.68422  | 7.44  | 1.624428 | 36.3 |
|     | S14 | −44.85668  | 7.00  | 1.426085 | 73.2 |
| FP  | S17 | INF        | 14.10 | 1.539800 | 56.6 |
|     | S18 | −350.00000 | 0.00  |          |      |

| ASPHERICAL COEFFICIENTS | | | | |
|-----|----------------|----------------|---------------|----------------|
|     | s3             | s4             | s11           | s12            |
| cc  | −0.559922      | 0.628784       | 5.125409      | −2.940980      |
| A4  | −0.223052E-06  | 0.271760E-06   | 0.173316E-06  | −0.135126E-06  |
| A6  | −0.278479E-09  | −0.681491E-10  | 0.891542E-09  | 0.143807E-09   |
| A8  | 0.241274E-12   | 0.263547E-12   | 0.262521E-12  | 0.721082E-12   |
| A10 | −0.739140E-16  | −0.351497E-16  | 0.668171E-16  | −0.223070E-16  |

TABLE 2.2

|     |     | R          | D       | N        | ν    |
|-----|-----|------------|---------|----------|------|
|     | OBJ | INF        | 1017.46 |          |      |
| G21 | S1  | 196.90804  | 10.69   | 1.591613 | 61.3 |
|     | S2  | 457.54365  | 8.55    |          |      |
| G22 | S3  | 77.35043   | 6.63    | 1.494250 | 55.4 |
|     | S4  | 137.85712  | 14.86   |          |      |
| G23 | S5  | 179.90838  | 3.23    | 1.624421 | 36.4 |
|     | S6  | 90.38261   | 8.17    |          |      |
| G24 | S7  | 74.14915   | 9.56    | 1.591617 | 61.3 |
|     | S8  | 303.97694  | 3.13    |          |      |
| G25 | S9  | 283.05781  | 11.05   | 1.518881 | 64.2 |
|     | S10 | −104.11349 | 18.72   |          |      |
| G26 | S11 | −111.94447 | 6.53    | 1.494250 | 55.4 |
|     | S12 | −67.33752  | 25.01   |          |      |
| G27 | S13 | −40.77880  | 5.79    | 1.624428 | 36.3 |
|     | S14 | −44.71111  | 8.56    | 1.426085 | 73.2 |
| FP  | S17 | INF        | 14.10   | 1.53980  | 56.6 |
|     | S18 | −350.00000 | 0.00    |          |      |

| ASPHERICAL COEFFICIENTS | | | | |
|-----|----------------|----------------|---------------|----------------|
|     | s3             | s4             | s11           | s12            |
| cc  | −0.559922      | 0.628784       | 5.125409      | −2.940980      |
| A4  | −0.223052E-06  | 0.271760E-06   | 0.173316E-06  | −0.135126E-06  |
| A6  | −0.278479E-09  | −0.681491E-10  | 0.891542E-09  | 0.143807E-09   |
| A8  | 0.241274E-12   | 0.263547E-12   | 0.262521E-12  | 0.721082E-12   |
| A10 | −0.739140E-16  | −0.351497E-16  | 0.668171E-16  | −0.223070E-16  |

TABLE 2.3

|     |     | R          | D       | N        | ν    |
|-----|-----|------------|---------|----------|------|
|     | OBJ | INF        | 1027.30 |          |      |
| G21 | S1  | 248.61001  | 10.15   | 1.591613 | 61.3 |
|     | S2  | 924.77441  | 25.13   |          |      |
| G22 | S3  | 77.35043   | 6.63    | 1.494250 | 55.4 |
|     | S4  | 137.85712  | 11.81   |          |      |
| G23 | S5  | 172.51628  | 5.00    | 1.624421 | 36.4 |
|     | S6  | 91.10413   | 8.85    |          |      |
| G24 | S7  | 75.48513   | 12.22   | 1.591617 | 61.3 |
|     | S8  | 284.36438  | 0.58    |          |      |
| G25 | S9  | 370.36155  | 14.60   | 1.518881 | 64.2 |
|     | S10 | −96.42526  | 19.84   |          |      |
| G26 | S11 | −111.94447 | 6.53    | 1.494250 | 55.4 |
|     | S12 | −67.33752  | 24.32   |          |      |
| G27 | S13 | −40.89422  | 5.00    | 1.624428 | 36.3 |
|     | S14 | −44.85668  | 7.66    | 1.426085 | 73.2 |
| FP  | S17 | INF        | 14.10   | 1.53980  | 56.6 |

TABLE 2.3-continued

| | | | | |
|---|---|---|---|---|
| S18 | −350.00000 | 0.00 | | |

| ASPHERICAL COEFFICIENTS | | | | |
|---|---|---|---|---|
| | s3 | s4 | s11 | s12 |
| cc | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

TABLE 2.4

| | | R | D | N | ν |
|---|---|---|---|---|---|
| | OBJ | INF | 1011.49 | | |
| G21 | S1 | 236.08918 | 4.52 | 1.591613 | 61.3 |
| | S2 | 552.34081 | 6.69 | | |
| G22 | S3 | 77.35043 | 6.63 | 1.494250 | 55.4 |
| | S4 | 137.85712 | 15.37 | | |
| G23 | S5 | 148.01294 | 3.00 | 1.624421 | 36.4 |
| | S6 | 87.19027 | 8.01 | | |
| G24 | S7 | 73.83944 | 8.88 | 1.591617 | 61.3 |
| | S8 | 210.11728 | 3.10 | | |
| G25 | S9 | 233.70090 | 11.76 | 1.518881 | 64.2 |
| | S10 | −101.56616 | 19.45 | | |
| G26 | S11 | −111.94447 | 6.53 | 1.494250 | 55.4 |
| | S12 | −67.33752 | 24.70 | | |
| G27 | S13 | −41.08075 | 3.00 | 1.624428 | 36.3 |
| | S14 | −44.85668 | 11.94 | 1.426085 | 73.2 |
| FP | S17 | INF | 14.10 | 1.53980 | 56.6 |
| | S18 | −350.00 | 0.00 | | |

| ASPHERICAL COEFFICIENTS | | | | |
|---|---|---|---|---|
| | s3 | s4 | s11 | s12 |
| cc | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

TABLE 2.5

| | | R | D | N | ν |
|---|---|---|---|---|---|
| | OBJ | INF | 1023.51 | | |
| G21 | S1 | 138.33828 | 5.23 | 1.591613 | 61.3 |
| | S2 | 298.41807 | 0.10 | | |
| G22 | S3 | 77.35043 | 6.63 | 1.49425 | 55.4 |
| | S4 | 137.85712 | 15.01 | | |
| G23 | S5 | 159.51241 | 3.00 | 1.624421 | 36.4 |
| | S6 | 78.98201 | 9.39 | | |
| G24 | S7 | 72.56864 | 9.50 | 1.591617 | 61.3 |
| | S8 | 362.80038 | 2.69 | | |
| G25 | S9 | 332.37957 | 10.66 | 1.518881 | 64.2 |
| | S10 | −101.49449 | 18.64 | | |
| G26 | S11 | −111.94447 | 6.53 | 1.49425 | 55.4 |
| | S12 | −67.33752 | 23.40 | | |
| G27 | S13 | −40.10311 | 3.00 | 1.624428 | 36.3 |
| | S14 | −44.55000 | 9.65 | 1.426085 | 73.2 |
| FP | S17 | INF | 14.10 | 1.53980 | 56.6 |
| | S18 | −350.00 | 0.00 | | |

TABLE 2.5-continued

ASPHERICAL COEFFICIENTS

|    | s3             | s4             | s11            | s12             |
|----|----------------|----------------|----------------|-----------------|
| cc | −0.659922      | 0.628784       | 5.125409       | −2.940980       |
| A4 | −0.223052E-06  | 0.271760E-06   | 0.173316E-06   | −0.135126E-06   |
| A6 | −0.278479E-09  | −0.681491E-10  | 0.891542E-09   | 0.143807E-09    |
| A8 | 0.241274E-12   | 0.263547E-12   | 0.262521E-12   | 0.721082E-12    |
| A10| −0.739140E-16  | −0.351497E-16  | 0.668171E-16   | −0.223070E-16   |

TABLE 3.1

|     |      | R           | D       | N        | v    |
|-----|------|-------------|---------|----------|------|
|     | OBJ  | INF         | 152.42  |          |      |
| G31 | S1   | 103.19409   | 14.70   | 1.591613 | 61.3 |
|     | S2   | 149.94069   | 3.62    |          |      |
| G32 | S3   | 77.35043    | 6.63    | 1.494250 | 55.4 |
|     | S4   | 137.85712   | 13.44   |          |      |
| G33 | S5   | 151.38789   | 4.80    | 1.624421 | 36.4 |
|     | S6   | 78.48039    | 6.19    |          |      |
| G34 | S7   | 64.62176    | 19.32   | 1.591617 | 61.3 |
|     | S8   | −121.59809  | 1.21    |          |      |
| G35 | S9   | −323.26791  | 4.80    | 1.624421 | 36.4 |
|     | S10  | 271.33801   | 4.67    |          |      |
| G36 | S11  | 150.69246   | 6.73    | 1.518881 | 64.2 |
|     | S12  | −84427.51952| 4.01    |          |      |
| G37 | S13  | −111.94447  | 6.53    | 1.494250 | 55.4 |
|     | S14  | −67.33752   | 27.49   |          |      |
| G38 | S15  | −38.00000   | 4.50    | 1.624428 | 36.3 |
|     | S16  | −41.80000   | 7.39    | 1.426085 | 73.2 |
| FP  | S17  | INF         | 14.1    | 1.539800 | 56.6 |
|     | S18  | −350.00000  | 0.00    |          |      |

ASPHERICAL COEFFICIENTS

|    | s3             | s4             | s13            | s14             |
|----|----------------|----------------|----------------|-----------------|
| cc | −0.559922      | 0.628784       | 5.125409       | −2.940980       |
| A4 | −0.223052E-06  | 0.271760E-06   | 0.173316E-06   | −0.135126E-06   |
| A6 | −0.278479E-09  | −0.681491E-10  | 0.891542E-09   | 0.143807E-09    |
| A8 | 0.241274E-12   | 0.263547E-12   | 0.262521E-12   | 0.721082E-12    |
| A10| −0.739140E-16  | −0.351497E-16  | 0.668171E-16   | −0.223070E-16   |

TABLE 3.2

|     |      | R            | D        | N        | v    |
|-----|------|--------------|----------|----------|------|
|     | OBJ  | INF          | 1054.20  |          |      |
| G31 | S1   | 112.06639    | 20.11    | 1.591613 | 61.3 |
|     | S2   | 169.38766    | 0.10     |          |      |
| G32 | S3   | 77.35043     | 6.63     | 1.494250 | 55.4 |
|     | S4   | 137.85712    | 13.15    |          |      |
| G33 | S5   | 153.60753    | 4.80     | 1.624421 | 36.4 |
|     | S6   | 78.67580     | 6.93     |          |      |
| G34 | S7   | 65.30329     | 18.62    | 1.591617 | 61.3 |
|     | S8   | −122.00473   | 1.29     |          |      |
| G35 | S9   | −314.19682   | 4.80     | 1.624421 | 36.4 |
|     | S10  | 271.73541    | 4.55     |          |      |
| G36 | S11  | 154.49974    | 7.10     | 1.518881 | 64.2 |
|     | S12  | −1588.28760  | 4.34     |          |      |
| G37 | S13  | −111.94447   | 6.53     | 1.494250 | 55.4 |
|     | S14  | −67.33752    | 27.34    |          |      |
| G38 | S15  | −38.20000    | 4.50     | 1.624428 | 36.3 |
|     | S16  | −42.02525    | 7.00     | 1.426085 | 73.2 |
| FP  | S17  | INF          | 14.1     | 1.539800 | 56.6 |
|     | S18  | −350.00000   | 0.00     |          |      |

TABLE 3.2-continued

| ASPHERICAL COEFFICIENTS | | | | |
|---|---|---|---|---|
| | s3 | s4 | s13 | s14 |
| cc | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

TABLE 3.3

| | | R | D | N | ν |
|---|---|---|---|---|---|
| | OBJ | INF | 1047.44 | | |
| G31 | S1 | 122.88025 | 19.11 | 1.591613 | 61.3 |
| | S2 | 198.07112 | 0.10 | | |
| G32 | S3 | 77.35043 | 6.63 | 1.494250 | 55.4 |
| | S4 | 137.85712 | 13.63 | | |
| G33 | S5 | 158.37837 | 4.80 | 1.624421 | 36.4 |
| | S6 | 79.55706 | 6.84 | | |
| G34 | S7 | 66.03712 | 18.36 | 1.591617 | 61.3 |
| | S8 | −119.25080 | 1.64 | | |
| G35 | S9 | −242.04558 | 4.80 | 1.624421 | 36.4 |
| | S10 | 404.20523 | 3.73 | | |
| G36 | S11 | 213.88618 | 6.92 | 1.518881 | 64.2 |
| | S12 | −438.83668 | 5.51 | | |
| G37 | S13 | −111.94447 | 6.53 | 1.494250 | 55.4 |
| | S14 | −67.33752 | 27.70 | | |
| G38 | S15 | −38.20000 | 4.50 | 1.624428 | 36.3 |
| | S16 | −41.80000 | 7.00 | 1.426085 | 73.2 |
| FP | S17 | INF | 14.1 | 1.539800 | 56.6 |
| | S18 | −350.00000 | 0.00 | | |

| ASPHERICAL COEFFICIENTS | | | | |
|---|---|---|---|---|
| | s3 | s4 | s13 | s14 |
| cc | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.211274E-12 | 0.263547E-12 | 0.262521E-12 | 0.721082E-12 |
| A10 | −0.739140E-16 | −0.351497E-16 | 0.688171E-16 | −0.223070E-16 |

TABLE 3.4

| | | R | D | N | ν |
|---|---|---|---|---|---|
| | OBJ | INF | 1032.52 | | |
| G31 | S1 | 143.88504 | 15.22 | 1.591613 | 61.3 |
| | S2 | 256.36330 | 0.10 | | |
| G32 | S3 | 77.35043 | 6.63 | 1.494250 | 55.4 |
| | S4 | 137.85712 | 14.65 | | |
| G33 | S5 | 161.50496 | 4.80 | 1.624421 | 36.4 |
| | S6 | 80.37615 | 6.45 | | |
| G34 | S7 | 66.31131 | 17.12 | 1.591617 | 61.3 |
| | S8 | −120.32958 | 1.63 | | |
| G35 | S9 | −240.17714 | 4.80 | 1.624421 | 36.4 |
| | S10 | 436.17953 | 4.07 | | |
| G36 | S11 | 257.00205 | 6.95 | 1.518881 | 64.2 |
| | S12 | −298.71189 | 6.47 | | |
| G37 | S13 | −111.94447 | 6.53 | 1.494250 | 55.4 |
| | S14 | −67.33752 | 27.36 | | |
| G38 | S15 | −38.00000 | 4.50 | 1.624428 | 36.3 |
| | S16 | −41.88454 | 7.00 | 1.426085 | 73.2 |

TABLE 3.4-continued

| FP | S17 | INF | 14.1 | 1.539800 | 56.6 |
|---|---|---|---|---|---|
| | S18 | −350.00000 | 0.00 | | |

ASPHERICAL COEFFICIENTS

| | s3 | s4 | s13 | s14 |
|---|---|---|---|---|
| cc | −0.559922 | 0.628784 | 5.125409 | −2.940980 |
| A4 | −0.223052E-06 | 0.271760E-06 | 0.173316E-06 | −0.135126E-06 |
| A6 | −0.278479E-09 | −0.681491E-10 | 0.891542E-09 | 0.143807E-09 |
| A8 | 0.241274E-12 | 0.263547E-12 | 0.262521E-12 | 0.721082E-12 |
| A10 | −0.739140E-16 | −0.351497E-16 | 0.668171E-16 | −0.223070E-16 |

What is claimed is:

1. A projection lens system for projecting an enlarged image onto a display screen from an image appearing on a faceplate of a cathode ray tube, comprising;

a first lens group, positioned at an end closest to said display screen, being in a form of a meniscus and having a negative power;

a second lens group having a convex surface towards said display screen and having a weak positive power;

a third lens group positioned between said second lens group and said cathode ray tube without another lens group intervening between said second lens group and said third lens group, and having a strong positive power;

a fourth lens group being bi-convex and having a strong positive power;

a fifth lens group having a weak positive power;

a sixth lens group having a pronounced concave surface away from said display screen and having a negative power;

said second and fifth lens groups each having lenses made of plastic with aspheric surfaces on both sides, and said third and fourth lens groups each having lenses with spherical surfaces on both sides.

2. The projection lens system as claimed in claim 1, wherein said first and second lens groups have a combined focal length of $f_{12}$ and the system has a focal length of f such that $0.0 < f/f_{12} < 0.15$ is satisfied.

3. The projection lens system as claimed in claim 1, wherein said first and second lens groups function together to provide weak convergence and a correction of spherical aberration and coma.

4. The projection lens system as claimed in claim 1, wherein said third and fourth lens groups function together to provide strong convergence.

5. The projection lens system as claimed in claim 1, wherein said fifth lens group functions to provide correction of astigmatism, distortion, and coma.

6. The projection lens system as claimed in claim 1, further comprising;

cooling liquid disposed between said sixth lens group and the faceplate.

7. The projection lens system as claimed in claim 6, wherein the faceplate of the cathode ray tube has a spherical fluorescent surface on an inside surface.

8. The projection lens system as claimed in claim 7, wherein said sixth lens group, together with said cooling liquid, functions to provide correction of a curvature with respect to correction of image formation on the fluorescent surface which is concaved away from the display screen.

9. The projection lens system as claimed in claim 1, wherein said aspheric surfaces of said second and fifth lens groups satisfy $$X = \frac{p^2/R}{1 + \{1 - (1 + CC) \cdot (p/R)^2\}^{1/2}} + A_4 \cdot p^4 + A_6 \cdot p^6 + A_8 \cdot p^8 + A_{10} \cdot p^{10};\text{ and}$$

wherein x denotes a distance in a direction of an optical axis from a flat plane normal to the optical axis, p denotes a distance from the optical axis, CC denotes an aspheric coefficient, and $A_4$, $A_6$, $A_8$, and $A_{10}$ denote high-order aspheric coefficients.

10. A projection lens system for projecting an enlarged image onto a display screen from an image appearing on a faceplate of a cathode ray tube, comprising:

a first lens group, positioned from an end closest to the display screen, being in a form of a meniscus and having a positive power;

a second lens group having a convex surface towards the display screen and having a weak positive power;

a third lens group being in a form of a meniscus and having a negative power;

a fourth lens group being in a form of a meniscus and having a positive power;

a fifth lens group, disposed close to said fourth lens group, being bi-convex and having a positive power;

a sixth lens group having a concave surface away from the display screen and having a positive power; and a seventh lens group having a pronounced concave surface away from the display screen and having a negative power;

said second and sixth lens groups each having lenses made of plastic with at least one aspheric surface.

11. The projection lens as claimed in claim 10, wherein the overall system has a focal length f, said first lens group has a focal length $f_1$, said third lens group has a focal length $f_3$, and said fifth lens group has a focal length $f_5$, such that $0.0 < f/f_1 < 0.3$, $-0.4 < f/f_3 < -0.1$, and $0.4 < f/f_5 < 0.8$ is satisfied.

12. The projection lens system as claimed in claim 10, wherein said second and sixth lens groups each have aspheric surface on both sides.

13. The projection lens system as claimed in claim 10, wherein said second lens group functions to provide weak convergence and correction of spherical aberration and coma.

14. The projection lens system as claimed in claim 10, wherein said third lens group functions to provide precise correction of aspherical aberration and coma.

15. The projection lens system as claimed in claim 10, wherein said fourth and fifth lens groups combine to provide strong convergence.

16. The projection lens system as claimed in claim 10, wherein said sixth lens group functions to provide correction of astigmatism, distortion, and coma.

17. The projection lens system as claimed in claim 10, further comprising:

cooling liquid disposed between said seventh lens group and the faceplate.

18. The projection lens system as claimed in claim 17, wherein the faceplate of the cathode ray tube has a spherical fluorescent surface on an inside surface.

19. The projection lens system as claimed in claim 17, wherein said seventh lens group, together with said cooling liquid, functions to provide correction of curvature with respect to a correction of image formation on the fluorescent surface which is concaved away from the display screen.

20. The projection lens system as claimed in claim 10, wherein said aspheric surfaces of said second and sixth lens groups satisfy $$X = \frac{p^2/R}{1+\{1-(1+CC)\cdot(p/R)^2\}^{1/2}} + A_4 \cdot p^4 + A_6 \cdot p^6 + A_8 \cdot p^8 + A_{10} \cdot p^{10}; \text{ and}$$

wherein x denotes a distance in a direction of an optical axis from a flat plane normal to the optical axis, p denotes a distance from the optical axis, CC denotes an aspheric coefficient, and $A_4$, $A_6$, $A_8$, and $A_{10}$ denote high-order aspheric coefficients.

21. The projection lens as claimed in claim 10, wherein said fourth lens group is separate from said third lens group.

22. A projection lens system of claim 1, wherein said first lens group is positioned between said cathode ray tube and said display screen, said second lens group is positioned between said first lens group and said cathode ray tube, said third lens group is positioned between said second lens group and said cathode ray tube, said fourth lens group is positioned between said third lens group and said cathode ray tube, said fifth lens group is positioned between said fourth lens group and said cathode ray tube, and said sixth lens group is positioned between said fifth lens group and said cathode ray tube.

23. A projection lens system for projecting an enlarged image onto a display screen from an image appearing on a faceplate of a cathode ray tube, comprising;

a first lens group, positioned at an end closest to said display screen, being in a form of a meniscus and having a negative power;

a second lens group having a convex surface towards said display screen and having a weak positive power;

a third lens group having a weak positive power;

a fourth lens group having a pronounced concave surface away from said display screen and having a negative power; and a lens disposed between said second lens group and said third lens group without another lens group intervening between said lens and said second lens group, and having a strong positive power overall;

said second and third lens groups each having lenses made of plastic with aspheric surfaces on both sides, and said lens, disposed between said second lens group and said third lens group, having spherical surfaces on both sides.

24. The projection lens system as claimed in claim 23, wherein said first and second lens groups have a combined focal length of $f_{12}$ and the system has a focal length of f such that $0.0<f/f_{12}<0.15$ is satisfied.

25. The projection lens system as claimed in claim 23, wherein said first and second lens groups function together to provide weak convergence and a correction of spherical aberration and coma.

26. The projection lens system as claimed in claim 23, wherein said lens unit functions to provide strong convergence.

27. The projection lens system as claimed in claim 23, wherein said third lens group functions to provide correction of astigmatism, distortion, and coma.

28. The projection lens system as claimed in claim 23, further comprising:

cooling liquid disposed between said fourth lens group and the faceplate.

29. The projection lens system as claimed in claim 28, wherein the faceplate of the cathode ray tube has a spherical fluorescent surface on an inside surface.

30. The projection lens system as claimed in claim 29, wherein said fourth lens group, together with said cooling liquid, functions to provide correction of a curvature with respect to correction of image formation on the fluorescent surface which is concaved away from the display screen.

31. The projection lens system as claimed in claim 23, wherein said aspheric surfaces of said second and third lens groups satisfy $$X = \frac{p^2/R}{1+\{1-(1+CC)\cdot(p/R)^2\}^{1/2}} + A_4 \cdot p^4 + A_6 \cdot p^6 + A_8 \cdot p^8 + A_{10} \cdot p^{10}; \text{ and}$$

wherein x denotes a distance in a direction of an optical axis from a flat plane normal to the optical axis, p denotes a distance from the optical axis, CC denotes an aspheric coefficient, and $A_4$, $A_6$, $A_8$, and $A_{10}$ denote high-order aspheric coefficients.

32. The projection lens system as claimed in claim 23, wherein said lens includes a lens group having a strong positive power, and a lens group which is bi-convex and has a strong positive power.

33. The project lens system as claimed in claim 23, wherein said lens unit is bi-convex.

34. A projection lens system of claim 23, wherein said first lens group is positioned between said cathode ray tube and said display screen, said second lens group is positioned between said first lens group and said cathode ray tube, said third lens group is positioned between said second lens group and said cathode ray tube, and said fourth lens group is positioned between said third lens group and said cathode ray tube.

* * * * *